United States Patent [19]

Namekawa

[11] Patent Number: 4,860,335
[45] Date of Patent: Aug. 22, 1989

[54] METHOD FOR NOTIFYING OF A CALL ARRIVAL

[75] Inventor: Makoto Namekawa, Iwaki, Japan

[73] Assignee: Alpine Electronics Inc., Japan

[21] Appl. No.: 177,876

[22] Filed: Mar. 24, 1988

Related U.S. Application Data

[63] Continuation of Ser. No. 881,069, Jul. 2, 1986, abandoned.

[30] Foreign Application Priority Data

Jul. 9, 1985 [JP] Japan ................... 60-150643

[51] Int. Cl.[4] ............................................. H01Q 7/04
[52] U.S. Cl. ..................................... 379/58; 340/539;
  340/825.31; 340/825.35; 379/63; 379/44
[58] Field of Search ................. 379/63, 58, 56, 59,
  379/62, 57, 44; 340/539, 825.31, 825.35, 531;
  455/54, 56, 58; 235/385, 375

[56] References Cited

U.S. PATENT DOCUMENTS

| 4,241,238 | 12/1980 | Strand ................................ 379/142 |
| 4,383,242 | 5/1983 | Sassover et al. ................... 340/539 |
| 4,393,242 | 5/1983 | Sassover et al. ................... 340/64 |
| 4,631,527 | 12/1986 | DeWitt et al. ..................... 340/539 |
| 4,661,972 | 4/1987 | Kai ..................................... 379/56 X |

FOREIGN PATENT DOCUMENTS

| 0077248 | 6/1980 | Japan ................................ 379/58 |
| 0164337 | 9/1983 | Japan ................................ 379/142 |
| 0204640 | 11/1983 | Japan ................................ 379/58 |
| 0219038 | 12/1984 | Japan ................................ 340/539 |
| 0046627 | 3/1985 | Japan ................................ 379/57 |
| 0119159 | 6/1985 | Japan ................................ 379/142 |
| 0187143 | 9/1985 | Japan ................................ 379/63 |

Primary Examiner—Robert Lev
Attorney, Agent, or Firm—Guy W. Shoup; Paul J. Winters; Stephen L. Malaska

[57] ABSTRACT

A call arrival notification method for a motor vehicle provided with a telephone system and a theft-preventing system allows the telephone system to be set to the call arrival notification mode. When a call arrives in the call arrival notification mode, the telephone system signals the call arrival to the theft-preventing system. The theft-preventing system transmits indication of the call arrival to a remote control unit which turns on/off the operation of the theft-preventing system, and the remote control unit provides a call arrival notification by a recognizable sound and display.

4 Claims, 5 Drawing Sheets

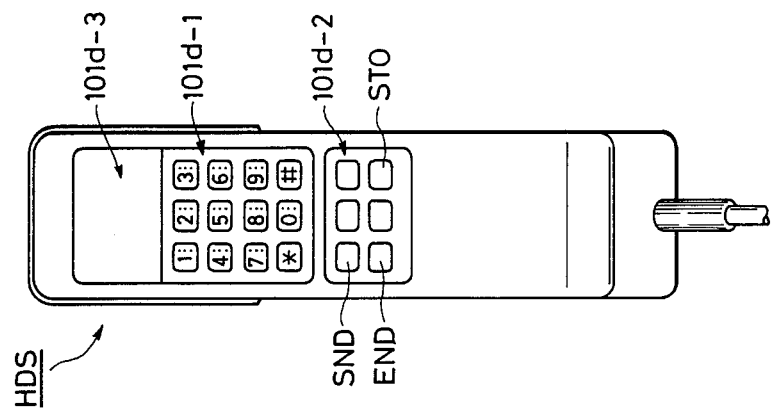
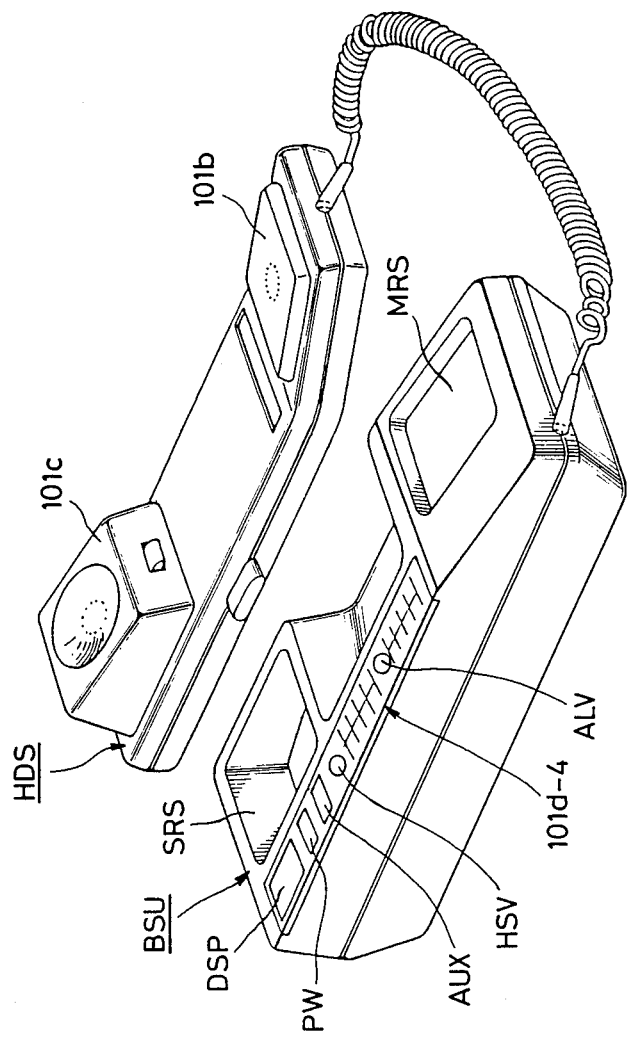

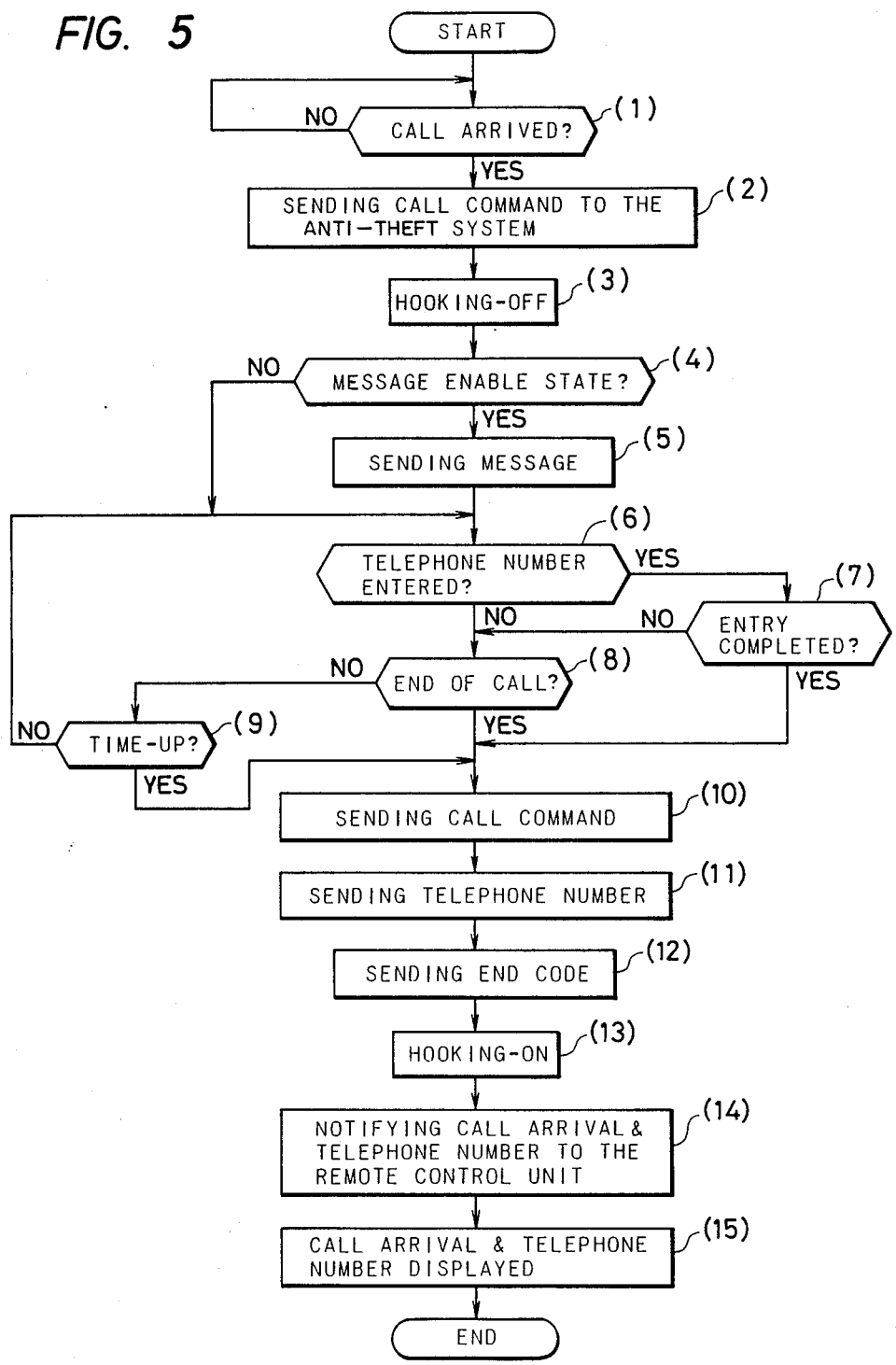

METHOD FOR NOTIFYING OF A CALL ARRIVAL

This is a continuation application from application Ser. No. 881,069 filed July 2, 1986, now abandoned.

BACKGROUND OF THE INVENTION

1. Field of the Invention

This invention relations to a call arrival notifying method which can notify a motor vehicle owner of the operation of an anti-theft system by means of a remote control unit.

2. Prior Art

Motor vehicle telephone systems have been in demand due to the expansion of telephone use in vehicles for business and security purposes. A cellular motor vehicle telephone system has been developed and widely used especially in the United States. In this cellular system, a service area is broken down into a plurality of cells each having a radius of approximately 6.4 km and each being provided with a radio station (base station). A base station receiving a radio wave from a vehicle telephone is successively selected along with the movement of the vehicle. This system assures communication with selected partners over a wide range and enables an increase of channels and communication lines almost infinitely.

In the cellular system, communication is enabled in response to a call from a caller by keeping an ignition switch and a power switch on. An outgoing telephone call is made by using the motor vehicle telephone system.

The telephone system during times when the ignition switch is turned off, provides a notification of a call from a caller by means of a horn or flashing vehicle head-lamp. The system is placed in the call notification mode when an AUX key (auxiliary alert key) is pressed to the power-on state. It should be noted that the call notification mode is utilized by a driver who wants to be notified a call even when he/she is away from the car.

However, conventional call notification methods usually do not notify the driver when the driver is remote from the car. This is because the conventional call notification is only provided by a horn or by a flashing head-lamp. In addition, although the driver may be notified of a call even at a place away from the vehicle by the flashing head-lamp, the driver sometimes fails to react the car in time.

SUMMARY OF THE INVENTION

It is therefore an object of the present invention to provide a call notification method for motor vehicle telephones for notification of a call arrival to driver of a vehicle even when the driver is away from the vehicle.

Another object of the present invention is to provide a call notification method for a motor vehicle telephone system which is able to provide a driver with a caller's telephone number together with a call notification when a call arrives.

In accordance with the present invention, a telephone system is set to a call notification mode. When a call arrives in the call notification mode, the telephone system signals the call arrival to an anti-theft system, which is in turn signals call arrival to a remote control unit. The remote control unit turns on/off the anti-theft system. Further, the remote control unit signals the call arrival by a recognizable means to the driver, thereby giving the driver a notification of a call even when the driver is at a place far away from the vehicle.

The method in accordance with the present invention also assures that a communication status is established when a call arrives in the call notification mode. A telephone number received from a caller is stored in a memory in the communication mode. The telephone number is sent to the remote control unit together with a call notification. The telephone number is displayed on a display section of the remote control unit, thereby providing a notification of the caller's telephone number together with a call notification.

BRIEF DESCRIPTION OF THE DRAWINGS

FIG. 2 is a perspective view of a control unit, FIG. 3 is a front view of a handset, FIG. 5 is a flow chart of other programs for the present invention.

DETAILED DESCRIPTION OF PREFERRED EMBODIMENTS (Means to solve the problem)

Figure 1:
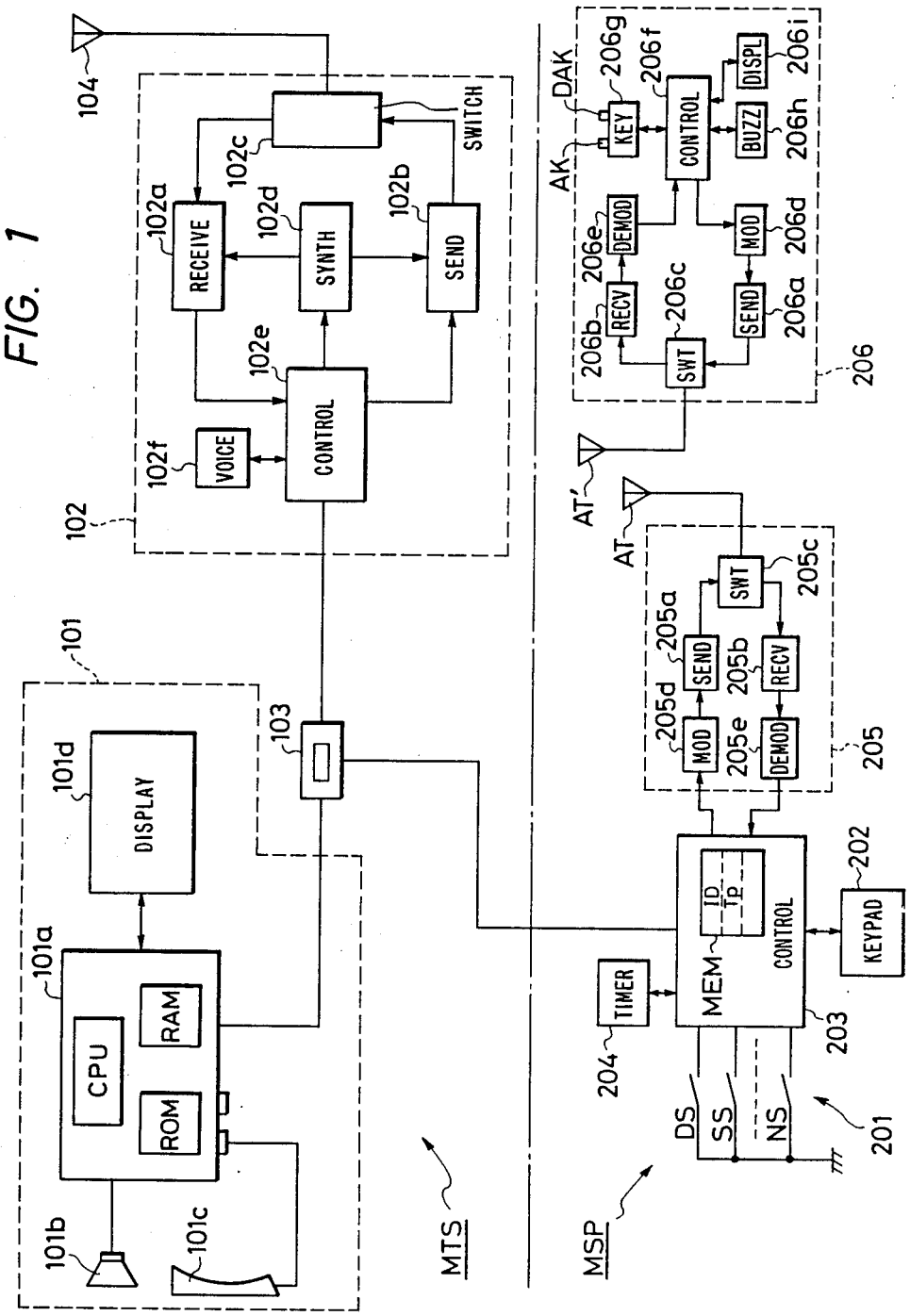
FIG. 1 is a block diagram of the system for realizing the call notification method in accordance with the present invention.

FIG. 1 is a block diagram of the system for realizing the call arrival notification method for motor vehicle telephone systems in accordance with the present invention.

The MTS is a motor vehicle telephone system and the MSP is a vehicle anti-theft system.

The motor vehicle telephone system MTS comprises a control unit 101, a transceiver unit 102, a T-connector 103, and an antenna 104.

The anti-theft system MSP comprises a sensor section 201 for detecting abnormalities relating to thefts, an operating section 202 provided with numeric and function keys, a control section 203 having a microcomputer, a timer 204, a transmitter receiver unit 205, and a remote control unit 206 referred to as a pager for externally turning on/off the anit-theft function and for notifying of call arrives as well as anti-theft alarms for the occurrence of abnormalities.

The control unit 101 and the transceiver unit 102 are interfaced for mutual communication by means of power control lines, digital data exchange lines, voice lines, etc., and the T-connector 103 connects the lines to the control unit 203 of the anti-theft system MSP.

(Function)

When the power for the motor vehicle telephone systme MTS is turned on, the telephone system is set to the call arrival notification mode by pressing the AUX key provided for the motor vehicle telephone system MTS.

When a call arrives in the call arrival notification mode, the telephone system MTS signals a call arrival notification to the anit-theft system MSP.

With this arrangement, the control unit 203 of the anti-theft system signals the call arrival to the remote control unit 206.

The remote control unit 206 gives the alarm by a recognizable means such as a buzzer for example for a notification of the the call arrival.

It is also possible to set the telephone system to the communication state upon reception of a call while the system is in the call arrival notification mode, to store a telephone number received from a call addressor in the communication state, and to send out the telephone number to the remote control unit.

(Examples)

FIG. 1 is a block diagram of the system for realizing the call notification method for a motor vehicle telephone system in accordance with the present invention. The MTS is a motor vehicle telephone system of a cellular type and the MSP is a theft-preventing system.

The motor vehicle telephone system MTS comprises a control unit 101, a transceiver unit 102, a T-connector 103, and an antenna 104.

The control unit 101 includes a computer-structured control section 101a with a processor CPU, a ROM, and a RAM; a speakerphone 101b; a microphone 101c; and operating/display section 101d. Mechanically, the control unit 101 is composed of a handset HDS and a base unit BSU, as shown in FIG. 2. On the back surface of the handset HDS installed are the speakerphone 101b., and the microphone 101c. On the front surface installed are, as shown in FIG. 3, a ten-key section 101d-1 for inputting telephone numbers, etc.; a function key section 102d-2 provided with a send key SEND, an end key END, etc.; and a display section 101d-3 for displaying the dialed number.

The base unit BSU includes, as shown in FIG. 2, a panel section 101d-4, a speakerphone rest section SRS, and a microphone rest section MRS. On the panel section 101d-4 provided are with a power on/off key PW, and an AUX key (AUX) for setting a call notification mode, an alert volume ALV for controlling the speakerphone level for a ring tone, a handset volume HSV for controlling the receiving volume for the handset, and a display section DSP for providing various displays. It should be noted that the ten-key section 101d-2, the display section 101d-3 in the handset HDS and the panel section 101d-4 in the base unit BUS constitute the operating/display section 101d as shown in FIG. 1.

The transceiver unit 102 includes a receiving section 101a, a transceiver section 102b, a switch section 102c for connecting the antenna 104 properly to the receive section or to the transmit section, synthesizer 102d for generating a pre-determined frequency signal, a control section 102e, and a voice response device 102f. The voice response device 102f is configured so that it outputs a pre-determined message in response to a command from the control section 102e.

The theft-preventing system MSP includes a sensor unit 201 for detecting abnormalities including the occurrence of theft activity at the vehicle, an operating unit 202 of a keyboard structure, a control unit 203 having a microcomputer, a timer 204, a transmitter receiver unit 205, and a remote control unit 206, (or pager) for turning on/off the anti-theft function and for outputting alarms for the occurrence of abnormalities and outputting call notifications.

The sensor unit 201 includes a door sensor DS for detecting door opening/closing, a shock sensor SS for detecting shocks exceeding a pre-determined shock level, a noise sensor NS for detecting that noise inside a vehicle has exceeded a pre-determined noise level, and other sonsors for detecting trunk door opening/closing, for example.

The operating unit 202 includes numerical and function keys which are used to store an ID code (password number) into a memory MEM of the control unit 203 or when operating the theft-preventing function of the system or clearing the operation of the theft-preventing function. The timer 204 starts clocking according to a command from the control unit 203, and elapsed time t is referred to as required by the control unit 203.

The transmitter receiver unit 205 includes a transmit section 205a, a receive section 205b, a switch section 205c for connecting an antenna AT properly to the transmit section 205a or to the receive section 205b, a modulator section 205d for modulating with a pre-determined frequency signal the digital data which is output from the control unit 203 and demodulator section 205e for demodulating the signal which is input from the receive section 205b and for inputting the demodulated signal to the control unit 203.

The remote control unit 206 includes a transmit section 206a, a receive section 206b, a switch section 206c, for connecting an antemna AT' properly to the transmit section 206a or to the receive section 206b, a modulator section 206d, a demodulator section 206e, a control section 206f, a key section 206g provided with an arming key AK for operating the anti-theft function of the theft-preventing system MSP and with a disarming key DAK for clearing the operating state of the anti-theft function, a buzzer 206h for notifying of call arrivals as well as outputting alarms for abnormalities, and a display section 206i for displaying a caller's telephone number.

The control unit 101 and the transceiver unit 102 of the motor vehicle telephone system MTS are interfaced by means of a plurality of power control lines, a plurality of digital data exchange lines, voice lines, etc., connected by means of the T-connector 103 to the control unit 203 of the theft-preventing system MSP. That is, the required power control lines, data transmit lines, and data receive lines are connected to the control unit 203 of the theft-preventing system MSP via the T-connector 103.

Figure 4:
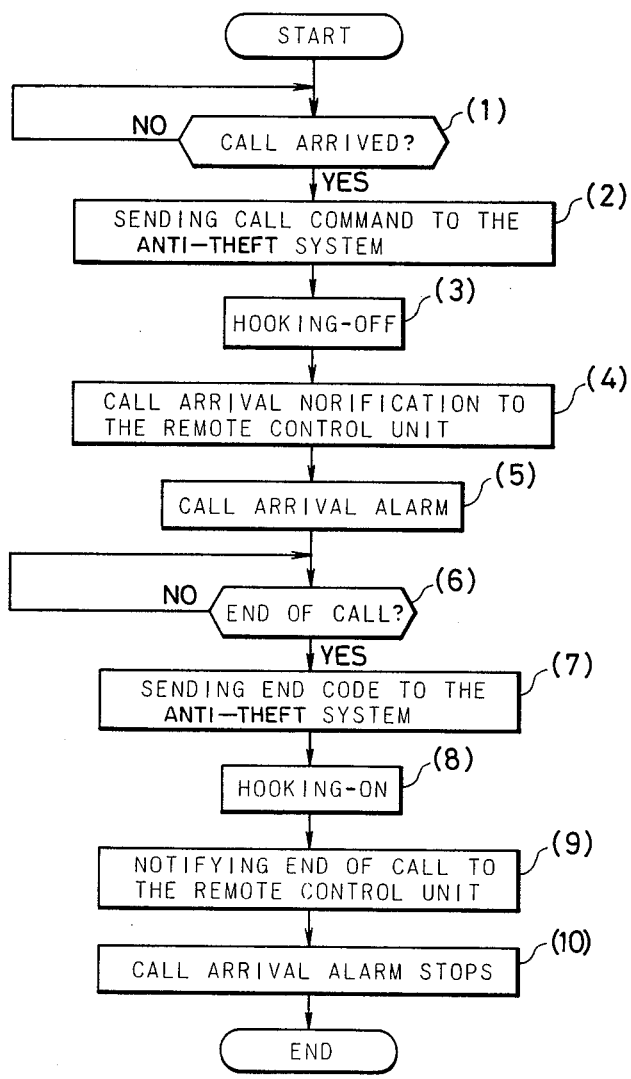
FIG. 4 is a flow chart of a programs for the present invention.

The operational steps in the call notification method in accordance with the present invention are described below with reference to the flow chart in FIG. 4. It is noted that FIG. 4 shows an example where no telephone number is displayed.

For an initial condition, the vehicle telephone system MTS is pre-set to the power-on state by operating the power-on/off key PW (FIG. 2) of the system, the system is further set to the call notification state by pressing the AUK key (FIG. 2) and the theft-preventing system MSP is set to the operating state.

(1) Under the call notification mode, the control section 102e of the transceiver unit 102 checks whether any external call (incoming call) has arrived at the vehicle telephone system MTS.

(2) When a call arrives, the control section 102e of the transceiver unit 102 sends a call command to the control unit 203 of the theft-preventing system MSP.

(3) Upon reception of the call command, the control unit 203 causes the vehicle telephone system MTS to be set to the hook-off state.

(4) The control unit 203 then transmits a predetermined code signal indicating call arrival to the remote control unit 206 via the transmitter receiver unit 205.

(5) The control section 205f of the remote control unit 206 decodes the received code and drives the buzzer 206h for notifying of the call arrival if the decoded code is a call arrival notification code. For distinguishing a call notification from an abnormality notification, it is necessary for the buzzer to have different tones or to display the call notification from the abnormality separately on the display section 206.

(6) The control section 102e of the transceiver unit 102 will be in the wait state until the end of the call. It should be noted that an end code is detected at the end of the call.

(7) At the end of the call, the control section 102e inputs the detected end code to the control unit 203 of the theft-preventing system MTS.

(8) Upon reception of the end code, the control unit 203 causes the hook-on state to occur.

(9) The control unit 203 also sends a code indicating the end of the call to the remote control unit 206.

(10) The remote control unit 206 stops the buzzer from sounding when it receives the end code.

Upon completion of the above steps, the motor telephone system MTS and the theft-preventing system MSP return to the initial state.

The above descriptions are directed to the case wherein a call arrival is notified simply to a driver by a recognizable means such as a buzzer or the like through the remote control unit. However, it is also possible to provide a system configuration which displays a caller's telephone number on the remote control unit.

FIG. 5 is a flow chart for the processing in the latter case. Like in the case of FIG. 4, the vehicle telephone system MTS is pre-set to the power-on state and to the call notification mode by pressing the AUK key (FIG. 2) and the theft-preventing system MSP is set to the operating state.

(1) Under the above call arrival notification mode, the control section 102e of the transceiver unit 102 checks whether any external call (incoming call arrival) has arrived at the vehicle telephone system MTS.

(2) When a call arrives, the control section 102e of the transceiver unit 102 sends a call command to the control unit 203 of the theft-preventing system MSP.

(3) Upon reception of the call command, the control unit 203 sends a hook-off signal to the motor vehicle telephone system MTS causing the motor vehicle telephone system to be set to the communication state.

(4) When the communication state is established in the call notification mode, the control section 102e of the transceiver unit 102 checks whether a message enabling state permits a pre-determined message to be sent out to a caller by using the voice response device 102f.

(5) Under the message enabling state, the control section 102e drives the voice response device 102f for sending the pre-determined message to the caller. This message is for requesting the caller's telephone number, such as "Nobody is available. Please input your telephone number through the keyboard."

(6) After the message is output or when a message enabling state is not established in the step (4), the control section 102e checks whether there is an entry of a telephone number.

(7) When a telephone number is entered, the control section 102e checks whether its entry is completed.

(8) When the entry of a telephone number is not completed or when no telephone number is entered, the control section 102e checks whether the line is disconnected (end code generated) with the call terminated.

(9) When the call is not completed (if an end code has not been generated), the control section 102e checks whether a pre-determined time has elapsed (time-up) since the establishment of the communication state.

(10) If time-up has not occurred, the steps subsequent to the step (6) are repeated. If time-up has occurred or when the call operation is completed or if the entry of a telephone number is completed normally (the telephone number is stored into a built-in memory of the control section 102e), the control section 102e sends a call command to the theft-preventing system MSP.

(11) If a telephone number has been entered, the control section 102e then inputs the telephone number to the control unit 203 of the theft preventing system MSP.

(12) After sending out the telephone number, the control section 102e inputs an end code to the control unit 103 of the theft-preventing system MTS.

(13) Upon reception of the end code, the control unit 203 sends a hook-on signal to the vehicle telephone system MTS to set the telephone system to the end of communication state for waiting for the next call.

(14) The control unit 203 then inputs the telephone number together with a pre-determined code signal to the remote control unit 206 via the transmitter receiver unit 205.

(15) The control section 206f of the remote control unit 206 decodes the received code, drives the buzzer 206h for notifying of a call arrival if the decoded code is a call arrival notification code. It displays the telephone number on the display section 206i.

The buzzer and the display can be terminated by an arrangement that a time Tp for sounding the buzzer and displaying a telephone number is pre-stored into a memory of the control unit 203, and that, when elapsed time t after sending a call arrival notification code becomes larger than Tp, a stop signal is sent to the remote control unit 206 so that the buzzer sounding and the telephone number display are cleared.

What is claimed is:

1. A method for notifying a vehicle owner of a call arrival to a telephone system installed in a vehicle which is also equipped with an anti-theft system of the type having a remote control unit carried by the vehicle owner for remotely operating the anti-theft system, comprising:

providing the telephone system and the anti-theft system in the vehicle, and providing the remote control unit with means for generating a buzzer sound in response to transmission of a call signal from the anti-theft system when the vehicle owner is remote from the vehicle;

placing the telephone system in a call arrival notification mode wherein it generates a call arrival signal upon receipt of an incoming call;

connecting the telephone system and the anti-theft system such that the telephone system inputs the call arrival signal to the anti-theft system when the telephone system receives an incoming call while in the call arrival notification mode;

providing the anti-theft system with a call arrival notification mode wherein, upon input of the call arrival signal from the telephone system, the anti-theft system transmits a call signal to the remote control unit carried by the vehicle owner; and setting the remote control unit to generate the buzzer sound indicating the call arrival to the vehicle owner remote from the vehicle when the call signal is transmitted from the anti-theft system.

2. A method according to claim 1, wherein said step of placing the telephone system in a call arrival notification mode includes placing the telephone system is an hook-off condition upon receipt of the call arrival signal, maintaining the hook-off condition until the incoming call is terminated, whereupon the telephone system provides an end-of-call signal to the anti-theft system, and the anti-theft system then provides an end signal to the remote control unit to terminate the buzzer sound.

3. A method according to claim 2, wherein said step of placing the telephone system in an hook-off condition while in the call arrival notification moded includes providing the telephone system with means for receiving a telephone number signal received on the incoming call and providing the telephone number signal to the anti-theft system, said step of providing the anti-theft system with a call arrival notification mode includes providing the telephone number signal to the remote control unit, and said step of setting the remote control unit includes providing a visual display of the telephone number corresponding to the telephone number signal received.

4. A method according to claim 3, wherein said step of providing the telephone system with means for receiving a telephone number signal includes means for sending out a voice message to the incoming caller requesting input of the telephone number signal.

* * * * *

UNITED STATES PATENT AND TRADEMARK OFFICE
CERTIFICATE OF CORRECTION

PATENT NO.   : 4,860,335

DATED        : August 22, 1989

INVENTOR(S)  : Makoto Namekawa

It is certified that error appears in the above-identified patent and that said Letters Patent is hereby corrected as shown below:

Title page:

Abstract

Line 7, should read --The theft preventing system notifies the call arrival to a remote control unit which turns on/off--

Signed and Sealed this

Fifteenth Day of May, 1990

Attest:

HARRY F. MANBECK, JR.

Attesting Officer

Commissioner of Patents and Trademarks